(12) United States Patent
Youm et al.

(10) Patent No.: US 8,222,321 B2
(45) Date of Patent: Jul. 17, 2012

(54) THERMOPLASTIC RESIN COMPOSITION WITH EMI SHIELDING PROPERTIES

(75) Inventors: Kyoung Tae Youm, Uiwang-si (KR); Young Sik Ryu, Uiwang-si (KR); Young Sil Lee, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 12/968,436

(22) Filed: Dec. 15, 2010

(65) Prior Publication Data

US 2011/0160372 A1 Jun. 30, 2011

(30) Foreign Application Priority Data

Dec. 31, 2009 (KR) ........................ 10-2009-0135027

(51) Int. Cl.
*C08K 9/10* (2006.01)
(52) U.S. Cl. ......... 523/215; 523/205; 524/495; 524/496
(58) Field of Classification Search .................. 523/205, 523/215; 524/495, 496
See application file for complete search history.

(56) References Cited

U.S. PATENT DOCUMENTS

| | | | |
|---|---|---|---|
| 5,827,997 A | 10/1998 | Chung et al. | |
| 2002/0108699 A1 | 8/2002 | Cofer et al. | |
| 2008/0195187 A1* | 8/2008 | Li et al. | 607/116 |
| 2009/0226673 A1* | 9/2009 | Friedersdorf et al. | 428/167 |
| 2009/0227162 A1* | 9/2009 | Kruckenberg et al. | 86/20.11 |
| 2010/0276645 A1* | 11/2010 | Aspin et al. | 252/513 |
| 2011/0160037 A1* | 6/2011 | Youm et al. | 502/1 |

FOREIGN PATENT DOCUMENTS

| | | |
|---|---|---|
| CN | 101585526 | 11/2009 |
| JP | 1999-193473 | 7/1999 |
| KR | 10-2007-0041024 A | 4/2007 |
| KR | 10-2009-0085801 A | 8/2009 |
| WO | WO 2008/146014 | * 12/2008 |

OTHER PUBLICATIONS

Park et al., "Fabrication and Microstructure of Metal-Coated Carbon Nanofibers using Electroless Plating," The Journal of the Korean Society for Composite Materials, vol. 20, No. 5, pp. 43-48 (2007).
Chen et al., "Electroless Plating of Carbon Nanotube with Nickel", New Carbon Material, vol. 15, No. 4, Dec. 2000, pp. 1-5.
Chinese Office Action in commonly owned Chinese Application No. 201010612596 dated Nov. 9, 2011, pp. 1-5.
English translation of Chinese Office Action in commonly owned Chinese Application No. 201010612596 dated Nov. 9, 2011, pp. 1-7.

* cited by examiner

*Primary Examiner* — Peter Szekely
(74) *Attorney, Agent, or Firm* — Summa, Additon & Ashe, P.A.

(57) ABSTRACT

The present invention provides a thermoplastic resin composition comprising (A) a thermoplastic resin, and (B) a carbon nanofiber-metal composite including a plurality of laminated truncated, conic graphenes continuously coated with a metal. The thermoplastic resin composition according to the present invention can have excellent EMI shielding properties.

16 Claims, 3 Drawing Sheets

THERMOPLASTIC RESIN COMPOSITION WITH EMI SHIELDING PROPERTIES

CROSS-REFERENCE TO RELATED APPLICATIONS

This application claims priority from Korea Patent Application No. 2009-0135027, filed Dec. 31, 2009, in the Korean Intellectual Property Office, the disclosure of which is incorporated herein by reference in its entirety.

FIELD OF THE INVENTION

The present invention relates to a thermoplastic resin composition that can have excellent electromagnetic interference (EMI) shielding properties.

BACKGROUND OF THE INVENTION

Electromagnetic radiation is steadily increasing in daily life because the electromagnetic spectrum being used is moving to a higher frequency band, due to increasing multifunctionality and miniaturization of electrical and electronic products and the development of information and communication equipment. Because of this phenomenon, the electromagnetic spectrum radiated from certain sources may cause malfunctions and system errors in surrounding devices and may also damage the human body, such as inducing fever. Therefore, there is increasing demand for EMI shielding technology, which can effectively prevent these problems.

Conventionally, EMI shielding technologies use metal instruments or metal painted or plated conductive membranes. However, if a metal instrument has a complex pattern, processability can deteriorate and the weight of the metal instrument can increase. Further, plating technologies can require complex processes, such as grease removal, etching, neutralizing, activating, accelerating, metalizing, activating, first plating, second plating, and third plating steps, which can impact productivity.

In contrast, electrical conducting and EMI shielding materials using polymer composite resins may have an advantage in terms of production cost and processability, because composite resin products can be produced by injection molding processes.

EMI (Electromagnetic Interference) Shielding Effectiveness may be represented by the following expression:

Shielding Effectiveness (S.E.)=$R+A+B$ wherein R is surface reflection of electromagnetic radiation, A is internal absorption of electromagnetic radiation, and B is loss caused by multi-reflection.

In the case of metal materials, EMI shielding effectiveness due to surface reflection of electromagnetic radiation can be high because of the higher conductivity (lower impedance) of metal materials. In order to increase the EMI shielding effectiveness of a resin composite, filler having high magnetic permeability can be used. Fillers with high magnetic permeability can increase electrical conductivity and surface reflection and also increase absorption of electromagnetic radiation.

U.S. Pat. No. 5,827,997 discloses a metal-coated carbon filament, for example a nickel coated carbon filament, prepared by an electroplating method, and a composite material including the same. Also, U.S. Publication No. 2002/0108699 discloses conductive fibers impregnated with a wetting agent and including a thermoplastic or thermoset sheath.

SUMMARY OF THE INVENTION

The present invention provides a thermoplastic resin composition that can have excellent EMI shielding properties.

The present invention also provides a molded article, prepared from the thermoplastic resin composition that can have excellent EMI shielding properties.

The thermoplastic resin composition of the invention comprises (A) a thermoplastic resin, and (B) a carbon nanofiber-metal composite, which can be formed by continuously coating a carbon nanofiber including a plurality of laminated truncated, conic graphenes with a metal.

In one embodiment of the present invention, (B) the carbon nanofiber-metal composite may be form a network structure in (A) the thermoplastic resin.

Examples of (A) the thermoplastic resin include without limitation polyphenylene sulfide; polyamide; polyalkylene terephthalate such as polyethylene terephthalate or polybutylene terephthalate; polyacetal; polyimide; polyphenylene oxide; polysulfone; polyamide imide; polyether sulfone; liquid crystal polymer; polyether ketone; polyether imide; polyolefin such as polypropylene or polyethylene; acrylonitrile-butadiene-styrene; polystyrene; syndiotactic polystyrene, and the like, and combinations thereof.

In exemplary embodiments of the present invention, the thermoplastic resin composition can include (A) about 50 to about 99% by weight of the thermoplastic resin, and (B) about 1 to about 50% by weight of the carbon nanofiber-metal composite.

In exemplary embodiments of the present invention, (B) the carbon nanofiber-metal composite may have a linear structure.

In exemplary embodiments of the present invention, the thermoplastic resin composition may have an EMI value of about 30 to about 50 dB. In other exemplary embodiments of the present invention, the thermoplastic resin composition may have a surface resistance value of about 0.1 to about $10^3 \Omega/\square$.

The present invention further provides an EMI shielding product prepared from the thermoplastic resin composition of the present invention.

DETAILED DESCRIPTION OF THE INVENTION

Figure 1:
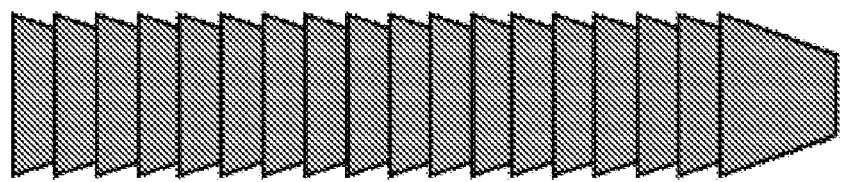
FIG. 1 schematically illustrates a structure of a carbon nanofiber including a plurality of laminated truncated, conic graphenes having the form of a hollow tube, the interior of which is empty.

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The present invention provides a thermoplastic resin composition comprising (A) a thermoplastic resin, and (B) a carbon nanofiber-metal composite, which can be formed by continuously coating a carbon nanofiber including a plurality of laminated, truncated, conic graphenes with a metal.

In order to impart EMI shielding properties to a thermoplastic resin composition, a thermoplastic resin can be impregnated with a filler having EMI shielding ability. Examples of filler having EMI shielding ability include metallic fillers, which can include various types and forms of metal powder, such as carbon fiber, carbon nanotubes, carbon nanofibers, and the like.

The metallic fillers can impart good electric conductivity and thereby good electromagnetic reflection properties. In particular, the use of metallic fillers having high permeability can improve EMI shielding properties by increasing electromagnetic absorption.

In order to impart effective EMI shielding properties to a composite prepared from a resin composition including metallic fillers, the fillers should form an effective network structure between themselves. As the amount of impregnated fillers increases, the network structure may be formed more easily. However, in this case (higher amount of filler), the resin composition comprising the metallic fillers may not be readily processed, and the mechanical strength of the final product may be deteriorated. Accordingly, in order to produce a resin composition having excellent EMI shielding properties and to maintain the inherent properties of the resin, a smaller amount of the fillers should be used.

In contrast to the processes which impregnate a resin with metal filler as described above, in the present invention, (B) the carbon nanofiber-metal composite can form the network structure in (A) the thermoplastic resin more easily, and thereby can impart excellent EMI shielding properties to the resin composition, even though a small amount of (B) the carbon nanofiber-metal composite is used.

In one embodiment of the present invention, the filler may be a carbon nanofiber-metal composite (B), which is formed by continuously coating a carbon nanofiber including a plurality of laminated, truncated, conic graphenes with a metal. The carbon nanofiber-metal composite (B) can easily form an effective network structure even with a small amount thereof, due to inherent properties of the fiber phase. Moreover, because the carbon nanofiber is coated with metal, the thermoplastic resin composition according to the present invention can improve both reflection by electrical conductivity and absorption by magnetic permeability, minimize the amount of the filler, and thereby reduce the total weight of the thermoplastic resin composition.

In one embodiment of the present invention, the carbon nanofiber-metal composite (B) may form a network structure in the thermoplastic resin (A).

Examples of (A) the thermoplastic resin include without limitation polyphenylene sulfide; polyamide; polyalkylene terephthalate such as polyethylene terephthalate or polybutylene terephthalate; polyacetal; polyimide; polyphenylene oxide; polysulfone; polyamide imide; polyether sulfone; liquid crystal polymer; polyether ketone; polyether imide; polyolefin such as polypropylene or polyethylene; acrylonitrile-butadiene-styrene; polystyrene; syndiotactic polystyrene, and the like, and combinations thereof.

In one embodiment of the present invention, the thermoplastic resin composition can include (A) about 50 to about 99% by weight of the thermoplastic resin, and (B) about 1 to about 50% by weight of the carbon nanofiber-metal composite.

In some embodiments, the thermoplastic resin composition may include the thermoplastic resin (A) in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99% by weight. Further, according to some embodiments of the present invention, the amount of the thermoplastic resin (A) can be in a range from about any of the foregoing amounts to about any other of the foregoing amounts.

In some embodiments, the thermoplastic resin composition may include the carbon nanofiber-metal composite (B) in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% by weight. Further, according to some embodiments of the present invention, the amount of the carbon nanofiber-metal composite (B) can be in a range from about any of the foregoing amounts to about any other of the foregoing amounts.

In exemplary embodiments of the present invention, (B) the carbon nanofiber-metal composite can have a large aspect ratio (Length/Diameter), and thereby can have increased magnetic permeability and electrical conductivity. Moreover, when using the above carbon nanofiber-metal composite in (A) the thermoplastic resin as a filler, the network structure of (B) carbon nanofiber-metal composite may be formed more easily, which can also improve reflection by electrical conductivity and absorption by magnetic permeability.

The thickness of the metal coating layer formed on the surface of the carbon-nanofiber can be adjusted, and the metal coating layer can be continuously formed. Thus, the electrical conductivity of the carbon nanofiber-metal composite can be improved.

In one embodiment of the present invention, the carbon nanofiber is in the form of hollow tube (or a cup-stacked carbon nanofiber) including a plurality of laminated truncated, conic graphenes and having an empty interior. This carbon nanofiber can exhibit increased conductivity compared to a carbon nanotube, because a uniform metal layer can be formed on the surface of the fiber.

The carbon nanofiber having the form of a hollow tube including a plurality of laminated truncated, conic graphenes and having an empty interior is a cup-stacked carbon nanofiber, i.e. a carbon nanofiber in which carbon network layers in the form of a bottomless cup are stacked, the middle of which is empty as in the carbon nanotube, and the average diameter of which is about 50 to about 200 nm. The distance between each layer is the distance between the graphite layers and can generally be about 0.35 nm.

FIG. 1 schematically illustrates a structure of the carbon nanofiber including a plurality of laminated truncated, conic graphenes and which is in the form of hollow tube, the interior of which is empty. The laminated truncated, conic graphene layers include exposed and reactive edges which can include reactive hydrogen atoms, which can function as chemically activatable positions, and the density of chemically activatable positions is much higher than that of conventional carbon nanotubes.

Figure 2:
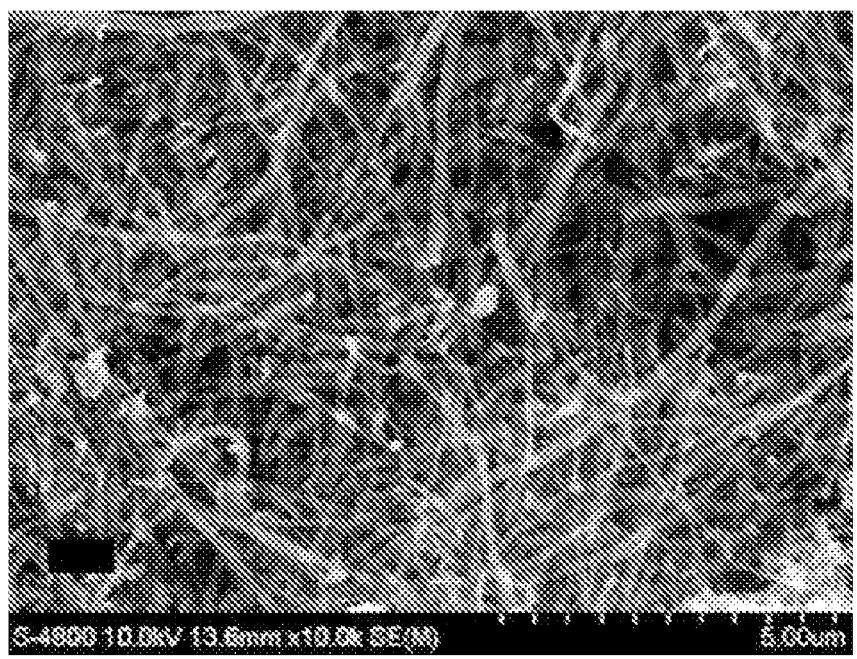
FIG. 2 is a scanning electron microscope image of an exemplary carbon nanofiber which can be used in the manufacture of a carbon nanofiber-metal composite included in the thermoplastic resin composition of the present invention.

FIG. 2 is a scanning electron microscope image of a carbon nanofiber including a plurality of laminated truncated, conic graphenes and which is in the form of hollow tube, the interior of which is empty.

The weight ratio of carbon to metal in the carbon nanofiber-metal composite can be about 1:1 to about 1:6, and the thickness of the metal coating layer can be about 1 to about 1,000 nm. If the carbon nanofiber-metal composite includes a carbon:metal weight ratio and metal coating thickness within the above ranges, the electrical conductivity and the EMI shielding ability of the same can be increased, and the weight of a molded article including the same may not be increased.

Examples of the metal in the metal coating layer can include without limitation Ni, Ni—P alloy, Ni—Fe alloy, Cu, Ag, Co, Sn, Pd, Au, and the like, alloys thereof, and combinations of two or more of the foregoing.

The carbon nanofiber-metal composite (B) can be prepared by digesting the carbon nanofiber with a solution including a catalyst so that the carbon nanofiber-metal composite (B) according to the present invention can further include a catalyst. The catalyst can act as a medium for attaching the metal coating to the carbon nanofiber. Examples of the catalyst may include without limitation Pd, Pd—Sn alloy, and the like, and combinations thereof.

When the carbon nanofiber has the form of a hollow tube including a plurality of laminated truncated, conic graphenes, and an empty interior, the metal catalyst can be attached onto one or both sides of the carbon nanofiber wall, because of the hollow structure. For example, the metal catalyst can be attached onto a region connecting truncated, conic graphene layers on both sides of the carbon nanofiber wall. Further, when the metal is coated on the metal catalyst attached onto a region connecting the inside wall or the outer wall, the metal coating layer can be formed onto the inside wall and/or the outer wall of the carbon nanofiber using the catalyst particles as a medium for attaching the metal coating to the carbon nanofiber.

In another embodiment of the present invention, the carbon nanofiber-metal composite (B) can have a linear structure. The linear structure of the carbon nanofiber-metal composite can be readily maintained. In contrast, the linear structure of a carbon nanotube is not well maintained, because the carbon nanotube can easily tangle with itself. Accordingly, the effective aspect ratio of the carbon nanofiber-metal composite can be larger than that of a carbon nanotube, and accordingly a very small amount of the carbon nanofiber-metal composite can form a network which can impart good electric conductivity and EMI shielding ability.

In exemplary embodiments of the present invention, the aspect ratio (Length/Diameter) of the carbon nanofiber-metal composite can be more than about 10, for example about 10 to about 200.

In other exemplary embodiments of the present invention, the average length of the carbon nanofiber-metal composite can be about 1 to about 10 μm, and the average diameter of the carbon nanofiber-metal composite can be about 10 to about 300 nm.

In other exemplary embodiments of the present invention, the specific resistance of the carbon nanofiber-metal composite can be about 0.01 to $10^0$ Ω·cm.

The carbon nanofiber-metal composite can be prepared by an electroless plating method.

In exemplary embodiments, the carbon nanofiber-metal composite according to the present invention may be prepared by the following method.

The method for preparing the carbon nanofiber-metal composite (B) can include treating a carbon nanofiber including a plurality of laminated truncated, conic graphenes with an acid solution to activate the surface of the carbon nanofiber; washing the surface-activated carbon nanofiber and then digesting the surface-activated carbon nanofiber with an acid solution in which a catalyst is dispersed to distribute the catalyst onto the surface of the carbon nanofiber; rewashing the carbon nanofiber on which the catalyst is distributed; and electroless plating the carbon nanofiber with a metal solution to form a metal coating layer.

The method for preparing the carbon nanofiber-metal composite in which the carbon nanofiber is coated with the metal by electroless plating can provide a metal nanofiber having a uniform (continuous) metal layer and a high aspect ratio. Also, the method for preparing the carbon nanofiber-metal composite can allow the adjustment of the thickness of the coating layer by changing the concentration of the metal solution and thus can provide a metal nanofiber having a desired diameter.

The method for preparing the carbon nanofiber-metal composite may further comprise a step of heat treating the carbon nanofiber on which the metal coating layer is formed. Through the step of heat treating, the crystallinity of the metal coating layer can be improved, the contact resistance can be reduced, and accordingly the carbon nanofiber-metal composite can be used as filler which can have effective electrical conductivity and EMI shielding ability.

The heat treating may be performed at a temperature of about 390 to about 450° C. over a period of about 20 to about 40 minutes.

In exemplary embodiments of the present invention, the carbon nanofiber can be in the form of a hollow tube (or a cup-stacked carbon nanofiber).

In exemplary embodiments of the present invention, the catalyst can be Pd, Pd—Sn alloy, or a combination thereof.

In other exemplary embodiments of the present invention, the catalyst can be distributed such that the number of catalyst particles is about 5 to about 50 catalyst particles per about 100 $nm^2$ of the surface area of the carbon nanofiber. If the catalyst is distributed in an amount within the above range, the metal coating layer can be formed continuously. If the catalyst is distributed in an amount less than the above range, the metal coating layer can be irregular. If the catalyst is distributed in an amount greater than the above range, excess metal catalyst can remain, which can increase the manufacturing costs.

The acid solution for activating the surface of carbon nanofiber can include without limitation nitric acid, sulfuric acid, hydrochloric acid, and the like, or a combination thereof.

The acid solution in which the catalyst nanoparticles are dispersed can also include without limitation nitric acid, sulfuric acid, hydrochloric acid, or a combination thereof.

Examples of the metal source of the metal solution can include without limitation Ni, Ni—P alloy, Ni—Fe alloy, Cu, Ag, Co, Sn, Pd, Au, and the like, alloys thereof, and combinations of two or more thereof. The thickness of the coating layer can be adjusted by changing the concentration of the metal solution. In exemplary embodiments, the concentration of the metal source in the metal solution can be about 0.01 to about 1 M, for example about 0.05 to about 0.1 M.

The thermoplastic resin composition according to the present invention can optionally further include one or more additives selected from the group consisting of antibiotic agents, release agents, heat stabilizers, antioxidants, light stabilizers, compatibilizers, dyes, inorganic fillers, surfactants, nucleating agents, coupling agents, fillers, plasticizers, impact modifiers, blending agents, coloring agents, stabilizers, lubricants, antistatic agents, pigments, and the like, and combinations thereof.

In exemplary embodiments of the present invention, the thermoplastic resin composition may have an EMI shielding effectiveness of about 30 dB or more, for example about 30 to about 50 dB.

In exemplary embodiments of the present invention, the thermoplastic resin composition may have a surface resistance value of about 0.1 to about $10^3 \Omega/\square$.

The present invention further provides an EMI shielding product prepared from the thermoplastic resin composition of the present invention.

The thermoplastic resin composition of the present invention can be prepared by conventional methods. For example, all the components and optional additives can be mixed together and extruded through an extruder and can be prepared in the form of pellets.

The composition can be molded using conventional techniques to form a product. Exemplary molding methods may be, but are not limited to, extrusion, injection, or casting molding, and may be easily carried out by a person with ordinary skill in the art.

The invention may be better understood by reference to the following examples, and which are intended for the purpose of illustration and are not to be construed as in any way limiting the scope of the present invention, which is defined in the claims appended hereto.

EXAMPLES

The particulars of the components used in the Examples and Comparative Examples are as follows:

(A) Thermoplastic Resin

A polyphenylene sulfide (PPS) made by Deyang company (product name: PPS-hb, type: linear) is used.

(B-1) Carbon Nanofiber-Metal Composite

A carbon nanofiber with an average diameter of 0.1 µm and an average length of 5 µm made by GSI-Creos Company (product name: PR24 grade) is used. The carbon nanofiber is in the form of a hollow tube including a plurality of laminated truncated, conic graphenes, and the interior of which is empty. FIG. 2 is a scanning electron microscope image of the carbon nanofiber.

In order to distribute the catalyst onto the carbon nanofiber uniformly, the carbon nanofiber is treated with a concentrated nitric acid at 115° C. for 30 minutes, and then the carbon nanofiber is washed with distilled water. Nanoparticles of Pd/Sn alloy are dispersed in an acid solution, the carbon nanofiber is digested with the acid solution, and then 1 M of diluted sulfuric acid is further added in the acid solution to accelerate the process. Then the carbon nanofiber is rewashed with distilled water. The resultant carbon nanofiber includes uniformly distributed nanoparticles of the Pd/Sn alloy.

Figure 3:
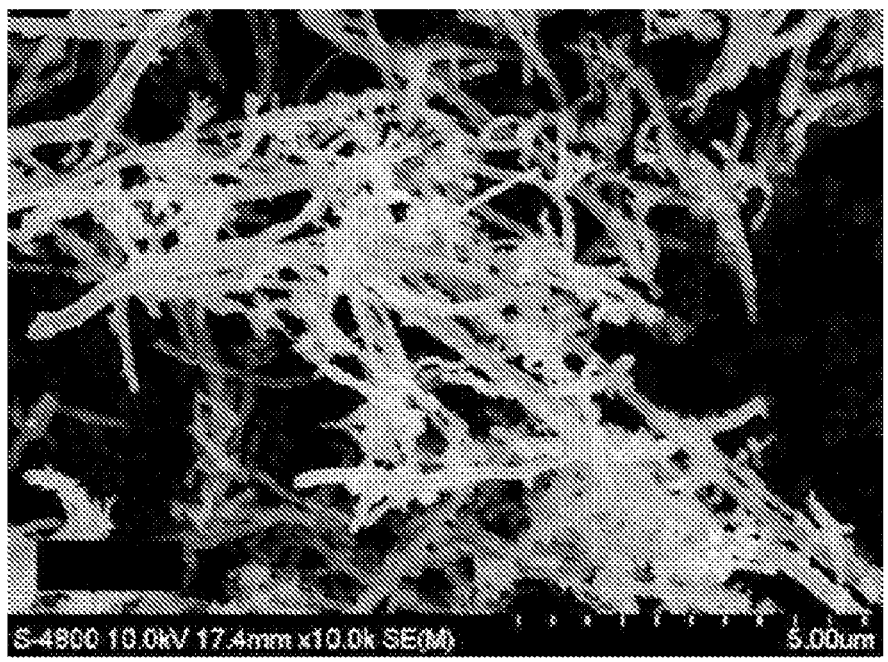
FIG. 3 is a scanning electron microscope image of an exemplary carbon nanofiber-metal composite which can be included in the thermoplastic resin composition of the present invention.

Then, the carbon nanofiber is dispersed by stirrer and subordinately ultrasonic oscillator, and the carbon nanofiber is electroless plated with 0.1 M of $NiSO_4.6H_2O$ solution to obtain a carbon nanofiber coated with metal. The carbon nanofiber coated with metal is heat treated at 450° C. for 20 minutes under an argon gas mixture to obtain a carbon nanofiber-metal composite. FIG. 3 is a scanning electron microscope image of the carbon nanofiber-metal composite prepared by above process.

In the carbon nanofiber-metal composite (B-1), an average weight increase per carbon nanofiber is 670%. For example, 1 g of carbon fiber is coated with 5.7 g of metal, and thereby 6.7 g of carbon nanofiber-metal composite is prepared.

(B-2) Carbon Nanofiber-Metal Composite

Figure 4:
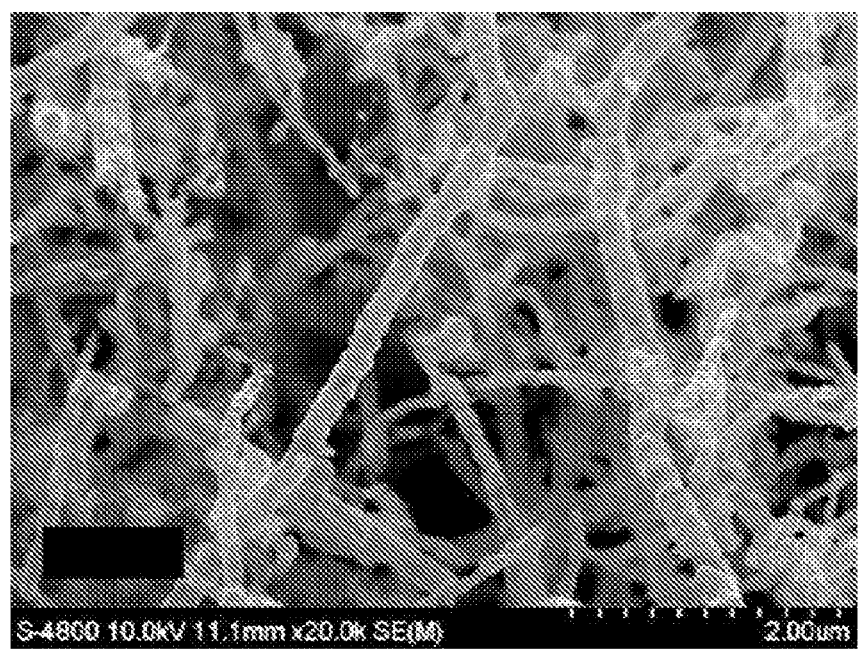
FIG. 4 is another scanning electron microscope image of a carbon nanofiber-metal composite, which can be included in the thermoplastic resin composition of the present invention.

A carbon nanofiber-metal composite is prepared in the same manner as the (B-1) carbon nanofiber-metal composite except that the carbon nanofiber is electroless plated with 0.05 M of $NiSO_4.6H_2O$ solution. A carbon nanofiber-metal composite comprising a metal layer with a thickness of 20 nm is obtained. FIG. 4 is a scanning elector microscope image of the carbon nanofiber-metal composite prepared by above process.

In the carbon nanofiber-metal composite (B-2), an average weight increase per carbon nanofiber is 420%. For example, 1 g of carbon fiber is coated with 3.2 g of metal, and thereby 4.2 g of carbon nanofiber-metal composite is prepared.

(B-3) Mixture of Carbon Nanofiber and Nickel Flake

A mixture of carbon nanofiber and nickel flake is used. The nickel flake is added for electrical conductivity, has a thickness of 1 µm and a width of 20 µm, and is made by NOVAMET Company (product name: HCA-1 Grade).

Examples 1-5

The thermoplastic resin and the carbon nanofiber-metal composite in the amounts set forth in the following Table 1 are mixed using a Haake mixer at 300° C. for 10 minutes to obtain a thermoplastic resin composition.

Comparative Examples 1-3

A thermoplastic resin composition is prepared in the same manner as in Examples 1-3 except that instead of the carbon nanofiber-metal composite, a mixture of carbon nanofiber and nickel flake in the amounts set forth in the following Table 1 are used.

Comparative Examples 4-5

A thermoplastic resin composition is prepared in the same manner as in Comparative Example 1 except that instead of the mixture of carbon nanofiber and nickel flake, only the carbon nanofiber is used in the amounts set forth in the following Table 1.

Circular test specimens formed of the compositions of examples 1-5 and comparative examples 1-5 are prepared to have a thickness of 2 mm and a diameter of 12 cm by way of heat compression. The EMI Shielding Effectiveness is measured in accordance with ASTM D4935, the Surface Resistance is measured in accordance with ASTM D257, and the measured results are shown in Table 1.

Figure 5:
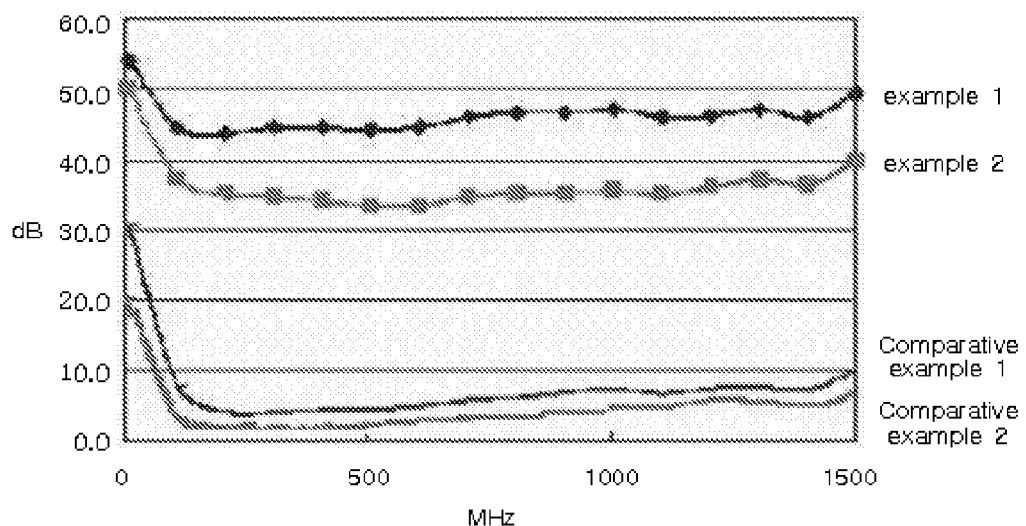
FIG. 5 and FIG. 6 are graphs illustrating electromagnetic radiation measurements of molded articles prepared using the thermoplastic resin composition according to the present invention.
Figure 6:
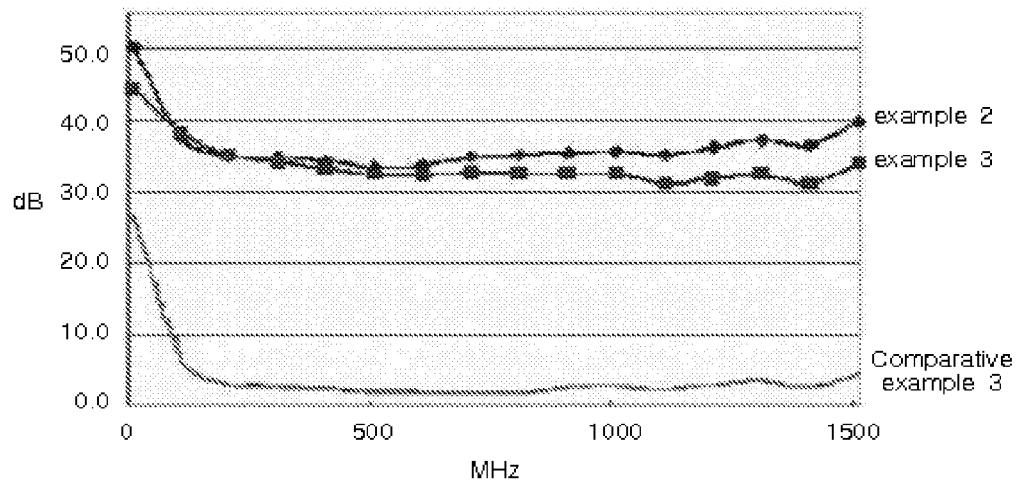

FIG. 5 is a graph comparing the measurement results of examples 1-2 and comparative examples 1-2. FIG. 6 is a graph comparing the measurement results of examples 2-3 and comparative example 3.

TABLE 1

|  | Examples | | | | | Comparative Examples | | | | |
| --- | --- | --- | --- | --- | --- | --- | --- | --- | --- | --- |
|  | 1 | 2 | 3 | 4 | 5 | 1 | 2 | 3 | 4 | 5 |
| (A) | 58 | 65 | 76 | 72 | 79 | 58 | 65 | 76 | 90 | 94 |
| (B-1) | 42 | 35 | | 28 | 21 | | | | | |
| (B-2) | | | 24 | | | | | | | |
| (B-3) carbon nanofiber | | | | | | 10 | 6 | 6 | 10 | 6 |
| nickel flake | | | | | | 32 | 29 | 18 | | |
| EMI Shielding Effectiveness (dB) | 47.3 | 35.7 | 32.6 | 33.1 | 30.5 | 7.4 | 4.5 | 2.8 | 2.6 | 1.8 |
| Surface Resistance (Ω/□) | $5 \times 10^{-1}$ | $2 \times 10^{1}$ | $2 \times 10^{2}$ | $1 \times 10^{2}$ | $6 \times 10^{2}$ | $3 \times 10^{4}$ | $1 \times 10^{6}$ | $7 \times 10^{11}$ | $\geq 10^{12}$ | $\geq 10^{12}$ |

As shown by the above Examples 1, 2, 4, and 5 of Table 1, as the amount of the carbon nanofiber-metal composite increases, EMI shielding effectiveness also increases. Also, as shown in the above Table 1, the thermoplastic resin compositions comprising the carbon nanofiber-metal composite prepared by Examples 1-3 demonstrate that the carbon nanofiber-metal composite having high aspect ratio is a very effective filler for EMI shielding, compared to the mixture of carbon nanofiber and nickel flake used in comparative Examples 1-3.

As shown by the above Examples 3-5, even if the thickness (weight) of metal coating layer of the carbon nanofiber-metal composite is reduced, EMI shielding effectiveness is almost unchanged, and further an effect of weight reduction is obtained.

As shown by the above Comparative Examples 4-5, when the thermoplastic resin composition includes only the carbon fiber, EMI shielding effectiveness and surface resistance is further deteriorated.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A thermoplastic resin composition comprising:
   (A) about 50 to about 99% by weight of a thermoplastic resin; and
   (B) about 1 to about 50% by weight of a carbon nanofiber-metal composite including a plurality of laminated truncated, conic graphenes continuously coated with a metal, wherein the average length of the carbon nanofiber-metal composite is about 1 to about 10 μm.

2. The thermoplastic resin composition of claim 1, wherein (B) the carbon nanofiber-metal composite forms a network structure in (A) the thermoplastic resin.

3. The thermoplastic resin composition of claim 1, wherein (A) the thermoplastic resin comprises polyphenylene sulfide; polyamide; polyalkylene terephthalate; polyacetal; polyimide; polyphenylene oxide; polysulfone; polyamide imide; polyether sulfone; liquid crystal polymer; polyether ketone; polyether imide; polyolefin; acrylonitrile-butadiene-styrene; polystyrene; syndiotactic polystyrene; or a combination thereof.

4. The thermoplastic resin composition of claim 1, wherein the weight ratio of carbon to metal in (B) the carbon nanofiber-metal composite is about 1:1 to about 1:6.

5. The thermoplastic resin composition of claim 1, wherein the metal comprises Ni, Ni—P alloy, Ni—Fe alloy, Cu, Ag, Co, Sn, Pd, Au, an alloy thereof, or a combination thereof.

6. The thermoplastic resin composition of claim 1, wherein the aspect ratio (Length/Diameter) of the carbon nanofiber-metal composite is about 10 to about 200.

7. The thermoplastic resin composition of claim 1, wherein the carbon nanofiber-metal composite further comprises a metal catalyst.

8. The thermoplastic resin composition of claim 5, wherein the carbon nanofiber-metal composite comprises about 7 to about 50 catalyst particles per about 100 nm² of the surface area of the carbon nanofiber.

9. The thermoplastic resin composition of claim 7, wherein the metal catalyst comprises Pd, Pd—Sn alloy, or a combination thereof.

10. The thermoplastic resin composition of claim 1, wherein the carbon nanofiber further comprises a metal catalyst on a region of the nanofiber connecting one or more of the truncated, conic graphene layers on both sides of the carbon nanofiber wall.

11. The thermoplastic resin composition of claim 1, wherein the carbon nanofiber-metal composite has an average length of about 1 to about 10 μm and an average diameter of about 5 to about 200 nm.

12. The thermoplastic resin composition of claim 1, wherein the metal coating layer formed on the carbon nanofiber-metal composite is formed on an inside wall, an outer wall, or both an inside wall and an outer wall of the carbon nanofiber.

13. The thermoplastic resin composition of claim 1, wherein the specific resistance of the carbon nanofiber-metal composite is about 0.01 to about 100 Ω·cm.

14. The thermoplastic resin composition of claim 1, wherein the metal is coated by an electroless plating method.

15. An EMI shielding product prepared from a composition of claim 1, having an EMI shielding effectiveness of about 30 to about 50 dB and a surface resistance value of about 0.1 to about 103Ω/□.

16. A thermoplastic resin composition comprising:
   (A) about 50 to about 99% by weight of a thermoplastic resin selected from the group consisting of polyphenylene sulfides, polyamides, polyalkylene terephthalates, polyacetals, polyimides, polyphenylene oxides, polysulfones; polyamide imides, polyether sulfones, liquid crystal polymers; polyether ketones, polyether imides, polyolefins, polystyrenes, syndiotactic polystyrenes, and combinations thereof; and
   (B) about 1 to about 50% by weight of a carbon nanofiber-metal composite including a plurality of laminated truncated, conic graphenes continuously coated with a metal, wherein the average length of the carbon nanofiber-metal composite is about 1 to about 10 μm.

\* \* \* \* \*

UNITED STATES PATENT AND TRADEMARK OFFICE
CERTIFICATE OF CORRECTION

PATENT NO. : 8,222,321 B2
APPLICATION NO. : 12/968436
DATED : July 17, 2012
INVENTOR(S) : Kyoung Tae Youm et al.

It is certified that error appears in the above-identified patent and that said Letters Patent is hereby corrected as shown below:

Claim 1, Column 9, Line 54, should read:

A thermoplastic resin composition comprising: (A) about 50 to about 99% by weight of a thermoplastic resin; and (B) about 1 to about 50% by weight of a carbon nanofiber-metal composite including a plurality of laminated truncated, conic graphenes continuously coated with a metal, wherein the average length of the carbon nanofiber-metal composite is about 1 to about 10 μm and the average diameter of the carbon nanofiber-metal composite is about 10 to about 300 nm.

Claim 16, Column 10, Line 66, should read:

A thermoplastic resin composition comprising: (A) about 50 to about 99% by weight of a thermoplastic resin selected from the group consisting of polyphenylene sulfides, polyamides, polyalkylene terephthalates, polyacetals, polyimides, polyphenylene oxides, polysulfones; polyamide imides, polyether sulfones, liquid crystal polymers; polyether ketones, polyether imides, polyolefins, polystyrenes, syndiotactic polystyrenes, and combinations thereof; and (B) about 1 to about 50% by weight of a carbon nanofiber-metal composite including a plurality of laminated truncated, conic graphenes continuously coated with a metal, wherein the average length of the carbon nanofiber-metal composite is about 1 to about 10 μm and the average diameter of the carbon nanofiber-metal composite is about 10 to about 300 nm.

Signed and Sealed this
Sixteenth Day of April, 2013

Teresa Stanek Rea
*Acting Director of the United States Patent and Trademark Office*